(12) United States Patent
Maier

(10) Patent No.: US 7,606,630 B2
(45) Date of Patent: Oct. 20, 2009

(54) METHOD FOR ELECTRONICALLY OPERATING TWO MACHINE TOOLS

(75) Inventor: Volker Maier, Ostfildern (DE)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 11/885,268

(22) PCT Filed: Feb. 27, 2006

(86) PCT No.: PCT/EP2006/060290

§ 371 (c)(1),
(2), (4) Date: Aug. 28, 2007

(87) PCT Pub. No.: WO2006/089963

PCT Pub. Date: Aug. 31, 2006

(65) Prior Publication Data

US 2008/0188971 A1    Aug. 7, 2008

(30) Foreign Application Priority Data

| Feb. 28, 2005 | (DE) | ....................... 10 2005 009 089 |
| Feb. 28, 2005 | (DE) | ....................... 10 2005 009 090 |
| Feb. 28, 2005 | (DE) | ....................... 10 2005 009 091 |
| Mar. 22, 2005 | (DE) | ....................... 10 2005 013 290 |

(51) Int. Cl.
*G06F 19/00* (2006.01)
*G05B 23/02* (2006.01)
*B23Q 7/14* (2006.01)
*B23Q 41/02* (2006.01)

(52) U.S. Cl. ....................... 700/161; 700/159; 700/160; 700/169; 700/180; 340/3.1; 340/3.3; 340/3.9; 483/15

(58) Field of Classification Search ......... 700/159–161, 700/169, 180; 340/3.1, 3.3, 3.9; 483/15
See application file for complete search history.

(56) References Cited

U.S. PATENT DOCUMENTS

| 5,812,394 | A  | * | 9/1998  | Lewis et al. .................... 700/17 |
| 6,243,611 | B1 | * | 6/2001  | Hazama et al. ................ 700/97 |
| 6,961,687 | B1 | * | 11/2005 | Myers et al. .................... 703/6 |
| 6,988,017 | B2 | * | 1/2006  | Pasadyn et al. ............. 700/121 |
| 7,460,920 | B1 | * | 12/2008 | Qu et al. ..................... 700/101 |
| 2002/0147521 | A1 | * | 10/2002 | Mok et al. ................... 700/159 |
| 2003/0014387 | A1 |   | 1/2003  | Kreidler et al. |
| 2004/0158474 | A1 |   | 8/2004  | Karschnia et al. |
| 2005/0187649 | A1 | * | 8/2005  | Funk et al. .................. 700/121 |

FOREIGN PATENT DOCUMENTS

| DE | 88 17 018 U1   | 12/1991 |
| DE | 101 52 765 A1  | 5/2003  |
| EP | WO 2006/128848 A1 * | 12/2006 |

* cited by examiner

*Primary Examiner*—Ramesh B Patel

(57) ABSTRACT

There is described a method for electronically operating a machine tool which comprises an electronic machine tool control and is positioned on a working place. Said machine tool is connected, through a data connection, to a server platform which is independent of the working place and on which software model algorithms run for simulating the machine tool behavior. For this purpose, said algorithms effect back the machine behavior in such a way that when process data items available through the data connection are deviated, process data items modified by calculated set values are transmitted through the data switch to the machine tool control and are used thereby. The machine tool control is carried out in sections, i.e. the section(s) are meaningfully considered on the basis of the software models of the machine tool behavior remotely from the software platform.

14 Claims, 1 Drawing Sheet

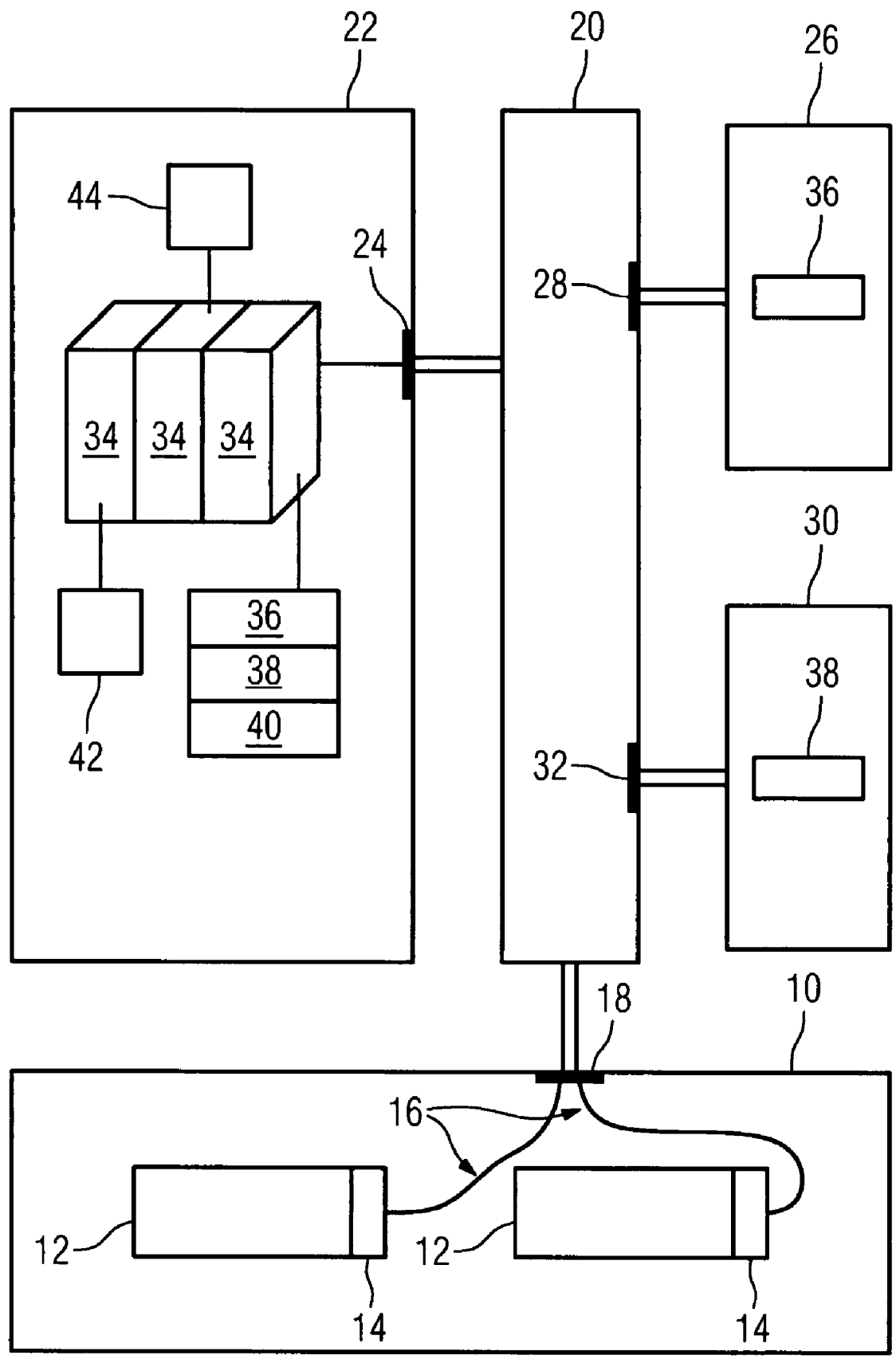

METHOD FOR ELECTRONICALLY OPERATING TWO MACHINE TOOLS

CROSS REFERENCE TO RELATED APPLICATIONS

This application is the US National Stage of International Application No. PCT/EP2006/060290, filed Feb. 27, 2006 and claims the benefit thereof. The International Application claims the benefits of German application No. 10 2005 009 090.7 DE filed Feb. 28, 2005, of German application No. 10 2005 009 091.5 DE filed Feb. 28, 2005, of German application No. 10 2005 009 089.3 DE filed Feb. 28, 2005, of German application No. 10 2005 013 290.1 DE filed Mar. 22, 2005, all of the applications are incorporated by reference herein in their entirety.

FIELD OF INVENTION

The present invention relates to a method for electronically operating, i.e. for electronically controlling, two machine tools over a spatial distance, i.e. also centrally from a server platform to a machine tool set up at a production site.

BACKGROUND OF INVENTION

In manufacturing processes, the continuous monitoring, improvement and adaptation of the process is important in order to achieve optimum product quality. Even though machine tools are nowadays controlled electronically, the process data accumulating there has previously been buffered only for short periods, insofar as a limited storage capacity and computing power of memories and machine control enable this, and used for brief analyses on site by specialist staff of the operator to optimize the process. In the prior art, continuous optimization and adaptation of process parameters is not carried out, above all not even in complex manufacturing processes.

It is now already possible for such complicated processes to be modeled in algorithms, but considerable computing capacity has to be available to do this.

From DE 101 52 765 A1 it is known for expert knowledge to be brought to a machine from machine manufacturers via the internet. A working computer is provided at the machine end. This working computer is connected via a data communication link to a host computer which is provided for generating and providing machine-specific data and services. With the aid of the working computer, machine status data can be detected in real time and transferred to the host computer, which generates, depending on such machine status data, data and services which are in turn sent to the working computer.

From US2003/0014387 A1, a system consisting of a host and a plurality of clients is known, it being possible for the clients to be CNC machine tools. Real-time data is recorded by the client systems, in particular with the aid of software which has been downloaded over a network from the host to the clients. The recorded data is fed over the network to the host which generates therefrom files that are also administered there.

The German utility model DE 881 70 18 U1 discloses a machine tool for complex processing, which machine tool comprises a first and second spindle headstock, each having drivable workpiece spindles which are arranged opposite to one another. With the aid of software, the two spindles are controlled such that they take up defined angular feed positions relative to one another.

SUMMARY OF INVENTION

An object of the present invention is to provide a method of the above-mentioned type, by means of which continuous monitoring and improvement of the overall process including at least two machine tools is possible.

The invention provides for this purpose a method as claimed in an independent claim.

According to the invention, a machine tool comprising an electronic machine control stands at a production site in data connection with a server platform that is independent of the production site. At least one software model algorithm is available on the server platform for simulating the machine behavior during operation. Process data is constantly or repeatedly transmitted, e.g. in a pulsed manner, from the machine via the data connection to the server platform, and this process data is edited or processed by the simulation algorithm. Within the scope of the algorithm, set process data is determined for a later point in time. In other words, it is determined how, starting from a defined point in time with the process running normally, the process data will look at a later point in time. The set process data is subsequently compared with actual process data for the later point in time, and a correction is carried out in the machine control, the algorithm generating changed values for at least some of the process data (that is, e.g. only some of the parameters), and this changed process data being sent via the data connection to the machine control. The machine control then uses the changed process data for controlling the machine. In addition, the software model algorithm records the interaction of the two machine tools in model form and generates on the basis of actual process data from the one machine tool set process data for the other machine tool.

The invention uses a separate server platform on which the highly complex algorithms can run, the expensive and sophisticated server platform being a central server platform which can be available for a plurality of production sites and machine tools, so that such a server platform does not have to be purchased to accompany each machine tool, which would exceed the scope of normal investment. The invention consequently avoids the situation where the process data of individual machines is stored only on small computers and enables a comprehensive collection of process data, for example also for optimizing software algorithms. On the economic side, billing to the owner of the machine tools or to the individual production sites can be effected such that the computing time of the pertinent software model algorithm is determined or it is determined how much working memory was required for how much time on the server platform. Within the scope of the invention, the entire production process, in particular the interaction of two machine tools, is reproduced in model form. The software algorithm influences the interaction of the two machines such that it generates on the basis of actual process data from the one machine tool set process data for the other machine tool.

According to a preferred embodiment, the software model algorithms have been loaded on to the server platform in advance via the same data connection, for example the internet, by the manufacturer of the machine and/or a software service provider. To transport the process data and the software model algorithms, the data connection can be equipped with access restrictions or be implemented in a coded manner.

A plurality of software model algorithms can be available, from which a selection is then effected by the production site via the data connection such that it is stipulated at the production end how the machine tool is represented in model form. All the process data can in particular be stored in order to optimize the software model algorithm continuously, also in relation not only to machine tool types but also to individual embodiments of machine tools.

A typical machine tool is a boring machine in which the spindle torque or the spindle current is recorded as process data.

Process data is not understood to mean long-term operational data such as, for example, the air humidity and the temperature in the factory workshop. Separate methods should be made available for these.

Process data is thus machine operational data which while operating the machine exhibits variably, particularly in the short term.

BRIEF DESCRIPTION OF THE DRAWING

A preferred embodiment of the invention will now be described with reference to the drawing, in which:

FIG. 1 shows the schematic structure of a system for electronically operating a machine tool remotely.

DETAILED DESCRIPTION OF INVENTION

FIG. 1 shows schematically a production site 10, at which a factory process is running, comprising a plurality of machine tools 12 which have electronic controls 14. The electronic controls 14 are connected via data lines 16 and an interface 18 to the internet 20. A central server 22 is also connected to the internet 20 via an interface 24. Also connected to the internet 20 are a manufacturer 26 via an interface 28 and a software service provider 30 via an interface 32.

A plurality of computer units 34 is now located in the central server platform 22, which units together form a server. A memory for storing software model algorithms 36, 38 and 40 is located in the computer units 34. The software model algorithms 36 and 38 serve here to represent the machine tools 12 in model form, and the software model algorithm 40 serves to control a machine tool that is not shown here, which could be set up at a different production site. The software model algorithms can, like the software model algorithm 36, originate from the manufacturer of the machine tools 12, but they can also, like the software algorithm 38, be produced specifically by a software service provider and likewise have been downloaded over the internet to the server platform 22. Different software algorithms, which represent different software models of the production process at the production site 10 in the computer program, are thus available. By means of the machine control 14, a selection of one of the software algorithms 36 and 38 is made for the pertinent machine 12. During the operation of the machine, such as for example a borer, a plurality of process data such as, for example, the spindle torque or the spindle current, is available in the machine control. This process data is carried as fully as possible and as promptly as possible, i.e. simultaneously, over the internet 20 to the server platform 22. The software model algorithms run there, tabulated start data, for example, being available as start data or data transmitted in advance being used. The software model algorithms can be arranged such that they start midway through the process that is running. The software model algorithms now predict how the start data and currently detected actual data will develop in future, i.e. the software model algorithms generate set process data for later points in time. The actual process data is then recorded at these later points in time and compared with the set process data. If these should not match one another (within defined limits predetermined by the software model algorithm), the software model algorithm generates changed values for at least some of the process data and transmits these over the internet 20 to the control 40 of the machine tools 12. Here, intervention in the operating sequences of the machine tools occurs: the machine tool 12 is no longer controlled at the production site 10 by the control 14 alone on the basis of data or data tables which are available there but changed process data generated by the server platform 22 is processed. For example, the server platform may determine on the basis of a boring depth of a hole to be bored by a boring machine 12 that the spindle torque of the boring machine has to be increased or reduced and outputs corresponding data to the machine control 14.

As previously mentioned, two different model algorithms 36 and 38 are available for a single machine tool. These algorithms can be further optimized by storing the process data in a memory 42, the changed process data generated by the software platform 22 in particular also being stored there. The accumulation of data in the memory 42 makes becomes possible to optimize the software model algorithms, i.e. to adapt the models to the real machine tools 12 or even to carry out an adaptation to individual machines.

In the production process, a plurality of machines often interact in succession, e.g. when a bore hole is bored, reboring is carried out by a second machine. The server platform 22 also serves to monitor and control the overall process, i.e. it receives and processes actual process data from the one machine tool in order to provide new parameters, new process data for the second machine tool.

The invention makes it possible for highly complex algorithms 36 and 38, which would overtax the machine control 14, to be run by powerful computer units that are available centrally. With the computer 34, the total outlay would even be too high for the production site 10. The invention therefore links an adept exchange of data with the adept use of resources. The individual computing times for individual production sites 10 or individual machine tools 12 can be recorded in a memory 44 in tabular form for billing. In this way, the server platform does not have to belong to the same owner as the production site. Viewed in terms of organizational theory, this is then a case of outsourcing of the automation monitoring at the production site by the operator of the production site 10.

The invention claimed is:

1. A method for electronically operating two machine tools, comprising:

providing a machine tool set up at a production site, wherein the machine tool has an electronic machine control, and wherein the machine tool is in data connection with a server platform, wherein the server platform is independent of the production site;

providing at least one software model algorithm on the server platform for simulating the machine behavior during operation, wherein the software model algorithm records an interaction of the two machine tools in model form and on the basis of actual process data from the one machine tool generates set process data for the other machine tool;

transmitting process data constantly or repeatedly from the machine control via the data connection to the server platform;

editing the process data based upon the software model algorithm;

determining set process data for a later point in time based upon the software model algorithm;

comparing the set process data with actual process data transmitted at the later point in time;

generating changed values for at least some of the process data based upon the algorithm;

sending the changed process data via the data connection to the machine control; and using the changed process data for controlling the machine at the production site by the machine control.

2. The method as claimed in claim 1, wherein the software model algorithm is loaded onto the software platform via the data connection by a manufacturer of the machine.

3. The method as claimed in claim 1, wherein the software model algorithm is loaded onto the software platform via the data connection by a software service provider.

4. The method as claimed in claim 1, wherein the data connection is effected over internet.

5. The method as claimed in claim 4, wherein the data connection has access restrictions.

6. The method as claimed in claim 4, wherein the data connection is coded.

7. The method as claimed in claim 1, wherein at least one software module algorithm is selected in the production site via the data connection, and wherein the selection is from a plurality of software model algorithms.

8. The method as claimed in claim 7, wherein a first software model algorithm is loaded onto the software platform via the data connection by a manufacturer of the machine and a second software model algorithm is loaded onto the software platform via the data connection by a software service provider.

9. The method as claimed in claim 7, wherein at least one process data is related to a spindle.

10. The method as claimed in claim 1, wherein the process data comprises a spindle torque for a boring machine.

11. The method as claimed in claim 1, wherein the process data comprises a spindle current for a boring machine.

12. The method as claimed in claim 1, wherein at least one process data is stored to optimize the software model algorithm.

13. The method as claimed in claim 1, wherein all process data are stored to optimize the software model algorithm.

14. The method as claimed in claim 1, wherein a computing time of the software model algorithm is determined in a tabular form for various machine tools.

* * * * *